Feb. 24, 1942.  G. A. ALLWARD  2,273,919
AIRCRAFT WING STRUCTURE
Filed Oct. 8, 1938   3 Sheets-Sheet 2
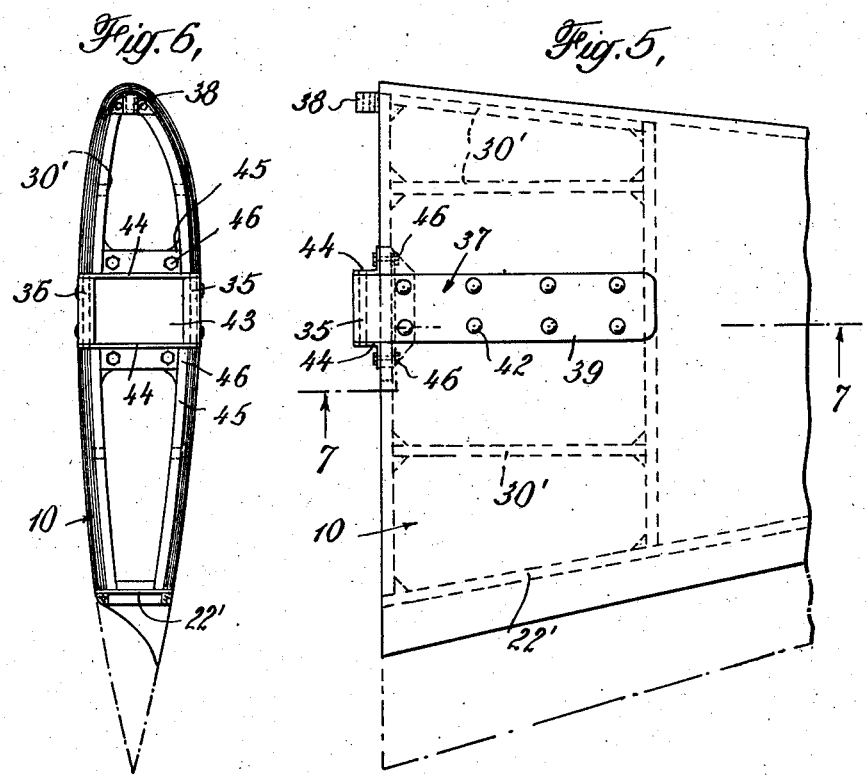
INVENTOR
George A. Allward
BY
Hoguet, Neary & Campbell
ATTORNEYS Feb. 24, 1942.   G. A. ALLWARD   2,273,919
AIRCRAFT WING STRUCTURE
Filed Oct. 8, 1938   3 Sheets-Sheet 3
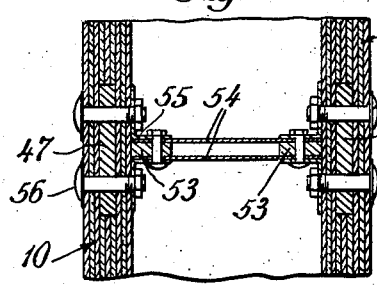
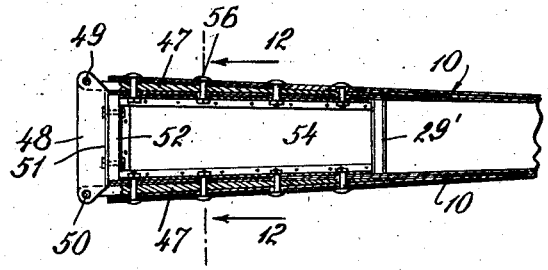
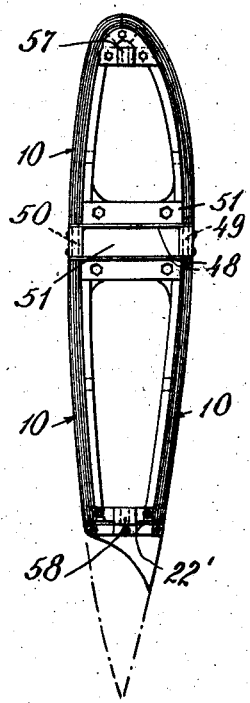
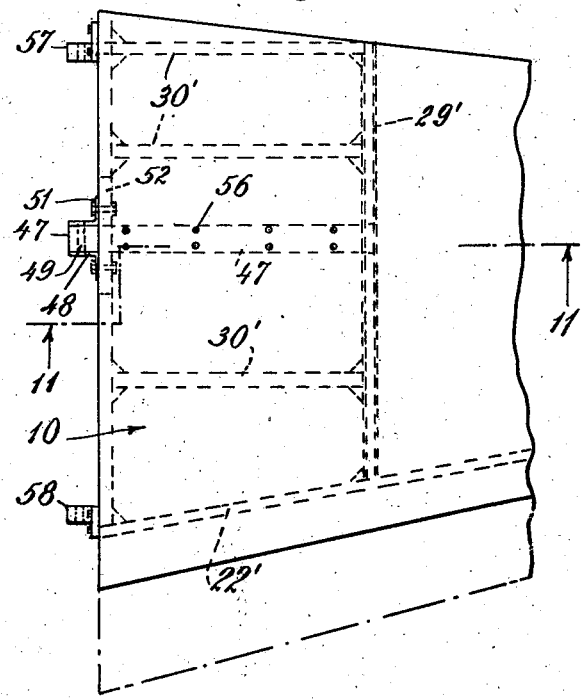
INVENTOR
George A. Allward
BY
ATTORNEYS Patented Feb. 24, 1942

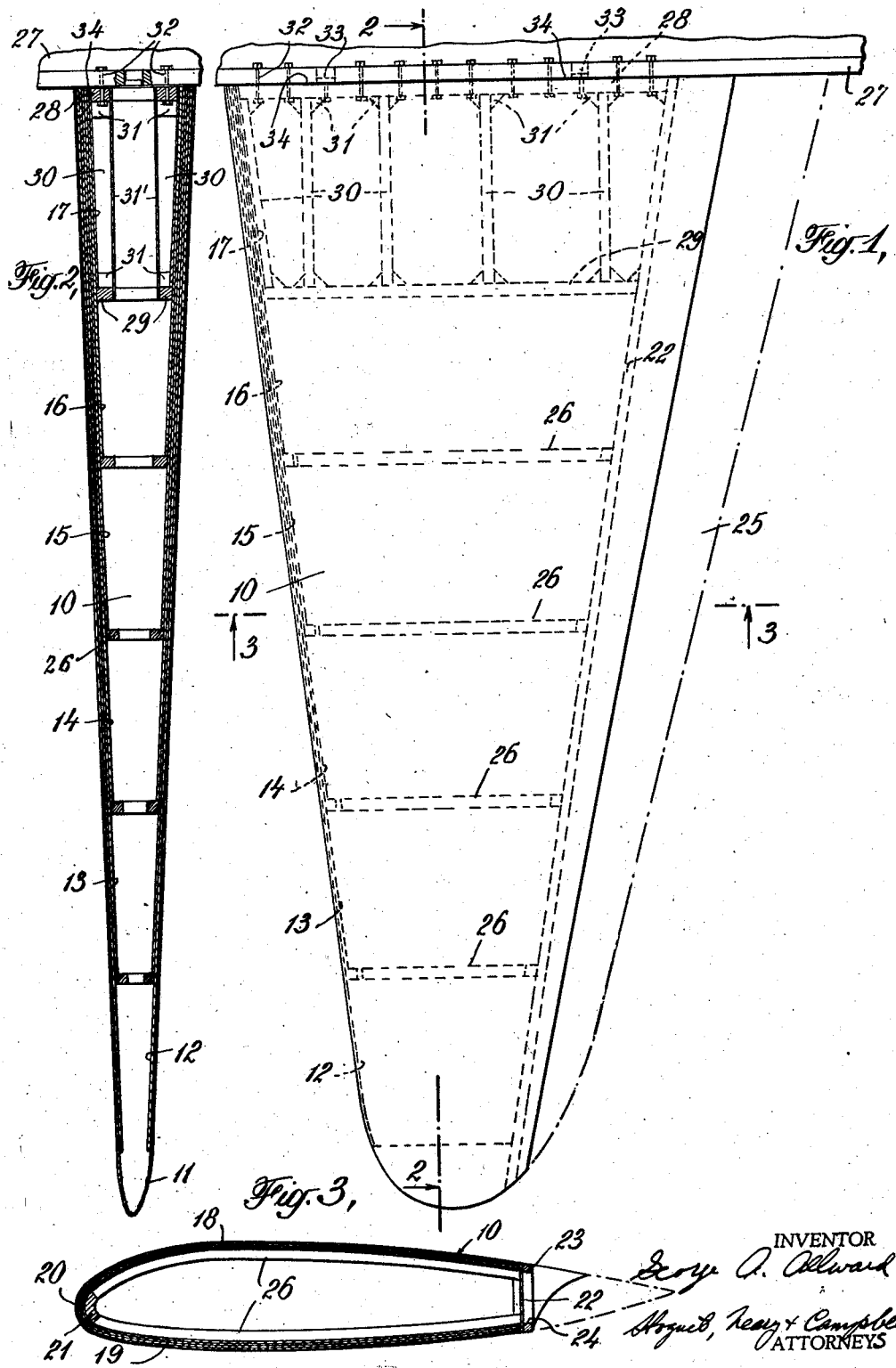

2,273,919

UNITED STATES PATENT OFFICE 2,273,919

AIRCRAFT WING STRUCTURE

George A. Allward, Hagerstown, Md., assignor, by mesne assignments, to John F. Neary, Jr., Englewood, N. J., as trustee Application October 8, 1938, Serial No. 233,934

4 Claims. (Cl. 244—123)

This invention relates to aeroplane wing structure and to arrangements for mounting the wing by load-transferring connections on the fuselage, hull, or other center section.

In copending application Serial No. 224,093, filed August 10, 1938, by V. E. Clark, there is disclosed a novel aeroplane wing structure comprising a shell whose structural material is so disposed around the contour of the airfoil section that the portions thereof above and below and most remote from the neutral aerodynamic axis of the airfoil section are thicker than the remaining portions of the shell, thus providing proper and safe structural strength and rigidity without undue increase in the airfoil thickness ratio. In order that the aforementioned thickened portions of the wing may be made as thick as is necessary to insure stability and strength for the wing under abnormal loads, the use of a structural material having low specific density, such as plywood, is recommended in that application.

The present invention is directed to an aeroplane wing structure having characteristics similar to those ascribed to the wing structure of said application, and preferably is also made of low specific density material, such as plywood, but is constructed in a different way, being distinguished from the aforementioned structure principally by the absence of any well-defined thickened portions in or on the shell wall as seen in cross-section. The instant invention is also concerned with novel arrangements for mounting any shell-like wing structure like these described above, on the fuselage, hull or other center section of the aeroplane.

In accordance with the invention, an aeroplane wing structure is provided in the form of a shell, of suitable material, which is so disposed around the airfoil contour that the thickness of the shell wall is substantially uniform as seen in transverse section, but decreases progressively in thickness longitudinally from the butt end to the tip of the wing, thus emphasizing the wing strength in accordance with the local load requirements. A beam is formed at and within the butt of the wing to there localize the loads due to bending, torsion and shear, for transfer thereof by suitable connections into the fuselage, hull or other center section.

In a preferred embodiment of the invention, the profile of the wing shell is formed of substantially uniform thickness plywood, on the inner surface of which is superimposed a series of layers comprising essentially transverse bands of plywood of progressively decreasing width longitudinally of the wing from a point near the tip to the butt end thereof, so that the shell wall tapers in thickness longitudinally from the butt toward the tip, but is uniform in thickness at any transverse section.

The wing load-transferring beam at the butt of the wing is preferably formed of a transverse butt bulkhead or its equivalent, and a spaced parallel bulkhead connected to the butt bulkhead by spanwise stringers to form the beam. The fittings for connecting the wing to the fuselage, hull, or other center section are suitably connected to the butt end beam, either for providing a wing support around the airfoil section, a three- or four-point support, or the like, to provide the requisite strong and rigid mounting for the cantilever wing thus formed. Chordwise bulkheads may also be employed for large wings to maintain the true air foil contour and to stabilize the wing shell against local loads and rigidity in torsion, rendering the wing of semi-monocoque construction.

It will be seen that the new aeroplane wing structure of this invention affords many advantages over those heretofore employed, and is simple, light, inexpensive to manufacture, and susceptible of large scale production with uniformity. The arrangements for mounting the shell wing to the center section of the aeroplane provide all the strength and rigidity afforded by the conventional spar and box girder type wings, without the inherent structural difficulties and weight thereof, and enables ready and rapid assembly and disassembly for replacement or repair.

For a more complete understanding of the invention, reference may be had to the accompanying drawings, in which:

Figure 1 is a plan view of an aeroplane wing constructed in accordance with the invention;

Fig. 2 is a longitudinal section therethrough as seen along the line 2—2 of Fig. 1;

Fig. 3 is a transverse section therethrough as seen along the line 3—3 of Fig. 1;

Fig. 4 is a view of the butt end of the wing illustrated in Fig. 1, and shows the means for mounting the wing around its airfoil contour to the fuselage, hull, or the like;

Fig. 5 illustrates the butt end of a wing with a three-point mounting arrangement therefor;

Fig. 6 is an end view of the arrangement of Fig. 5;

Fig. 7 is a longitudinal section through the wing butt of Fig. 5 as seen along the line 7—7 thereof;

Fig. 8 is an enlarged vertical section therethrough as seen along the line 8—8 of Fig. 7;

Fig. 9 illustrates the butt end of a wing with a four-point mounting arrangement therefor;

Fig. 10 is an end view thereof;

Fig. 11 is a longitudinal section through the wing butt of Fig. 9, as seen along the line 11—11 thereof; and Fig. 12 is an enlarged vertical section as seen along the line 12—12 of Fig. 11.

Referring to Fig. 1 of the drawings, numeral 10 designates a straight tapering or triangular wing in plan, which has the longitudinal section illustrated in Fig. 2, and the airfoil contour in section as illustrated in Fig. 3. The wing may be oval, elliptical in plan with a curved leading edge, or any other usual or desirable shape.

Although any suitable material may be employed to form the wing 10, nevertheless, in order to provide sufficient strength to enable the wing to sustain even abnormal loads without unduly increasing the weight thereof, it is desirable to employ a material having a low specific density, such as on the order of less than fifty pounds per cubic foot. Thus, by employing suitable low density material enabling thickening of the wing wall at points of greatest stress, the wing may be made self-stabilizing under high compressive loads, in that the material will not fail by buckling until or after the full compressive strength of the actual material has been developed.

As heretofore stated, plywood lends itself admirably to the structure of an aeroplane wing, having substantial strength per unit of volume and yet being so light in weight that any thickness of wing shell wall can be employed that loading conditions may require, as well as having the advantage of moldability into practical shapes, depending upon the shaping or forming process employed. Thus the outer contour wall 11 of the wing may be formed of plywood, the three or more plies thereof being preferably so arranged that the grain of the two surface plies extends generally longitudinally of the wing 10 and the grain of the inner ply transversely thereto. Of course, a greater or fewer number of plies may be employed, depending upon requirements.

Suitably secured permanently to the inner surface of the outer shell wall 11, so as to become integral therewith, is a layer of plywood 12, which extends from near the tip to the butt end of the wing, being in effect, a wide band extending around the airfoil contour to form a double-thickness wall. A second such band-like layer of plywood 13, of less width, or length longitudinally of the wing, is overlaid on the layer 12, so that the wing shell wall is of triple thickness from a point inward of the end of the second layer 12 to the wing butt, as illustrated in Figs. 1 and 2. Similar but progressively narrower bands 14, 15, 16 and 17 are bonded in overlapping layers to each other, as illustrated in Figs. 1 and 2, so that the wing shell wall tapers in longitudinal section from the wing butt to tip, but is of uniform thickness at any transverse section, as illustrated in Fig. 3. The edges of the layers 12 to 17, inclusive, may be scarfed in accordance with well-known practice, so that the several overlapping layers merge smoothly into each other.

In order to facilitate and simplify construction the wing shell 10 may be formed of upper and lower half-shells, 18 and 19, respectively, being built up from the successive layers of plywood as described, while conformed to the desired shape in the manner disclosed in copending application Serial No. 187,864, filed January 31, 1938, by O. H. Basquin, for example, although any other suitable process may be employed.

The half-shells 18 and 19 may be secured together along the leading edge of the wing at 20 by suitable means, such as the wood bar 21, to which the half-shells are permanently attached as by a weather-proof adhesive, or other mechanical means, the exact position of the joint 20 on the contour of the composite wing shell thus formed being largely determined by the draft requirements of the moulds in or on which the half-shells 18 and 19 are formed.

The half-shells 18 and 19 are preferably secured together at their rear or trailing edges by means of a false spar 22 suitably secured to the half-shells 18 and 19 by wooden blocks or bars 23 and 24, respectively. The false spar 22 may be of truss or other suitable construction, or of plywood with lightening holes and the like. Where the wing 10 is constructed of full monocoque form, the false spar 22 and the leading edge of the wing, including bar 21, jointly carry shear. The ailerons, flaps and other parts along the trailing edge of the wing 10, indicated in dot and dash outline at 25 in Fig. 1, may be mounted wholly or partly on the false spar 22, as will be readily understood.

For large wings, a semi-monocoque construction may be employed, in which chordwise bulkheads are utilized to maintain the true airfoil contour and to stabilize the wing shell against local loads and rigidity in torsion. Such bulkheads 26 are illustrated in Figs. 1, 2 and 3, as being spaced lengthwise of the wing 10, being preferably positioned at each flap and aileron hinge so as to evenly distribute the concentrated loads, arising from the control surfaces indicated at 25, into the wing shells 18 and 19. The bulkheads may be rings, as indicated, plywood webs with or without lightening holes, as illustrated in said copending Clark application, truss structures, or any other arrangement which will serve the purpose described. The bulkheads are rigidly secured, as by adhesive bonding, to the inner surfaces of the wing half-shells 18 and 19, and are conveniently and preferably positioned at the ends of the layers 13 to 17, inclusive, as shown.

Figs. 1, 2, and 4 illustrate a preferred arrangement for localizing the loads due to bending, torsion and shear in the butt of the wing and transferring these loads to the fuselage, hull or other center section designated 27 in Figs. 1 and 2. In this arrangement, a butt bulkhead 28 in the form of a ring of airfoil contour formed of wood, metal or the like, is bonded or otherwise permanently secured to the inner surface of the wing shell 10 as shown particularly in Figs. 2 and 4. Extending between the butt bulkhead 28 and a parallel chordwise bulkhead 29, similar to bulkheads 26, are a plurality of spaced spanwise stringers 30, which are secured permanently to the inner surface of the wing shell 10 and the bulkheads 28 and 29, to which they are also securely braced by blocks 31. If desired, this structure may be smoothed and additionally braced by overlaying the inner surfaces of bulkheads 28 and 29 and the stringers 30 by plywood 31' bonded in place. It will be observed that this structure forms a beam at and within the wing butt.

The fittings or mounting means for securing the wing to the fuselage, hull, or other center section 28, depend largely on the weight of the wing, the loads to be transmitted thereby, and the design of the structure to which the wing is to be attached. Thus, when the fuselage 27 is of monocoque construction, as indicated in Figs. 1 and 2, the attachment is preferably made by passing a large number of relatively small-sized bolts 32 through the flange formed by the butt bulkhead 28 and the wall or similar flange on the fuselage 27, as indicated in Figs. 1, 2 and 4. Centering dowels 33 on suitable panels 34 may be employed for properly locating the wing on the fuselage, which is provided with registering openings therefor.

Figs. 5 to 8, inclusive, illustrate an alternative arrangement in which the entire tension and compression due to the wing bending moment are taken by bolts or pins passing through the two horizontal bolt eyes or barrels 35 and 36 on the fitting 37 located at the point of maximum thickness of the airfoil, and the shears, both direct and due to torsion, are divided between bolts or pins in eyes or barrels 35 and 36 and a third connection 38 located as far as possible from the main fitting 37 to obtain the maximum base and consequent greatest rigidity. As illustrated in Figs. 5 and 6, this third point may be at the leading edge on one of the corresponding spanwise stringers 30', or it may be on the false spar 22'.

As is illustrated particularly in Figs. 7 and 8, the main fitting 37 includes two sets of flat plates 39 and 40, respectively, overlying the corresponding outer surfaces of the wing shell and inner surface of a wide span-wise stringer 41, bolts or rivets 42 passing through this assembly to secure it together, as shown. The upper set of plates 39 and 40 terminates in the upper bolt or pin eye or barrel 35 and the lower set terminates in the lower bolt or pin eye or barrel 36, which are connected by vertical plate 43 having lateral flanges 44 and secured by bolts 46 to a vertical stringer 45. If desired, a plywood layer 34' may overlie the inner surfaces of the stringers 30' and 41 as indicated in Figs. 7 and 8. Cooperating fittings, not shown, but mounted on the fuselage, hull, or other center section, receive the bolts or pins of eyes or barrels 35, 36 and 38 to mount the wing on the craft in a manner readily understood.

An alternative construction involving a four-point mounting for the wing is illustrated in Figs. 9 to 12, inclusive. In this arrangement the straps 47 of the center fitting 48 are inserted in sockets or moulded into the wing shell walls and bolted or riveted in place at 56, as shown in Figs. 11 and 12. The straps 47 terminate in respective upper and lower bolt eyes or barrels 49 and 50, connected by a flanged plate 51 secured to a flat vertical stringer 52. A vertical panel in the nature of a shear web, comprising longitudinal strips 53 connected by plywood panels 54 and secured to the fittings 55 of bolts 56, extends between the upper and lower wing walls and between the stringer 52 and the chordwise bulkhead 29'. Fitting 57 is mounted at the leading edge of the wing on the end of the stringer 30', and fitting 58 is mounted on the false spar 22', these fittings 57 and 58 with the bolt or pin eyes or barrels 49 and 50, suitably connected by bolts or pins to similar fittings on the fuselage, form the rigid four-point support for the wing. Alternatively by employing two fittings, each having the bolt or pin eyes or barrels 49 and 50, at spaced points, the wing may be attached by a four-point mounting to a two-spar center section or fuselage. In that case, fittings 57 and 58 are omitted, the four bolts carrying loads due to bending as well as shears.

It will be seen that the present invention provides a wing structure and arrangement for mounting the same which have many advantages over those heretofore employed. While wings have been described herein as illustrative of the invention, other aerodynamic elements, such as vertical and horizontal stabilizers, ailerons, elevators, flaps, rudders, and the like may be constructed and mounted in the same way. By employing plywood, the parts may be conformed to any desired shape with low weight and with aerodynamically smooth surfaces, thereby reducing air skin friction losses, and thus further increasing the aeroplane speed, as well as saving time, material and construction costs.

Although certain preferred embodiments of the invention have been illustrated and described herein, it is to be understood that the invention is not limited thereby, but is susceptible of changes in form and detail within the scope of the appended claims.

I claim:

1. A structure for aeroplane wings and the like, comprising a hollow shell of airfoil contour, a transverse bulkhead within the butt end of said shell and secured thereto, a second transverse bulkhead within said shell and secured thereto and spaced from said first bulkhead, spanwise stringers connecting said bulkheads and secured to the shell, and fastening members connected to said transverse butt bulkhead for securing the shell to the aeroplane.

2. A structure for aeroplane wings and the like, comprising a hollow shell of airfoil contour, a transverse bulkhead within the butt end of said shell and secured thereto, a second transverse bulkhead within said shell and secured thereto and spaced from said first bulkhead, spanwise stringers connecting said bulkheads and secured to the shell, and bolts extending through said butt bulkhead for securing the shell to the aeroplane.

3. A structure for aeroplane wings and the like, comprising a hollow shell of airfoil contour, a transverse bulkhead within the butt end of said shell and secured thereto, a second transverse bulkhead within said shell and secured thereto and spaced from said first bulkhead, spanwise stringers connecting said bulkheads and secured to the shell, said bulkhead and stringer combination forming a structural beam within the butt end of the shell for there localizing the loads applied to the shell, and a plurality of spaced fastening means secured to the beam thus formed for securing the shell at a plurality of spaced points to the aeroplane.

4. A structure for aeroplane wings and the like, comprising a hollow shell of airfoil contour consisting of upper and lower half-shells, each comprising a plurality of layers of plywood bonded to each other and of progressively decreasing lengths longitudinally of the wing so as to progressively overlap from the butt toward the tip of the wing, each layer extending chordwise of the wing from the leading edge thereof to provide a shell wall of substantially uniform thickness at any transverse section therethrough, means securing said half shells together at their leading edges, a longitudinal spar securing said half-shells together at their trailing edges, mounting means for the wing including a transverse bulkhead secured within the wing at the butt end thereof, and securing members connected to said last-named means for mounting the wing on the aeroplane.

GEORGE A. ALLWARD.